United States Patent
Ngo et al.

(10) Patent No.: US 10,237,342 B2
(45) Date of Patent: Mar. 19, 2019

(54) COORDINATED AND HIGH AVAILABILITY STORAGE ACCESS

(71) Applicant: DH2I COMPANY, Fort Collins, CO (US)

(72) Inventors: Thanh Q. Ngo, Oregon City, OR (US); Samuel Revitch, Portland, OR (US)

(73) Assignee: DH2I Company, Fort Collins, CO (US)

( * ) Notice: Subject to any disclaimer, the term of this patent is extended or adjusted under 35 U.S.C. 154(b) by 350 days.

(21) Appl. No.: 14/657,273

(22) Filed: Mar. 13, 2015

(65) Prior Publication Data

US 2016/0080489 A1    Mar. 17, 2016

Related U.S. Application Data

(60) Provisional application No. 62/051,373, filed on Sep. 17, 2014.

(51) Int. Cl.
*H04L 29/08* (2006.01)
*H04L 29/06* (2006.01)

(52) U.S. Cl.
CPC ........ *H04L 67/1095* (2013.01); *H04L 63/102* (2013.01); *H04L 67/1097* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 7,266,722 B2 * | 9/2007 | Kingsbury | G06F 9/526 707/999.202 |
| 8,295,599 B2 * | 10/2012 | Katougi | H04N 1/3878 382/103 |
| 8,296,599 B1 * | 10/2012 | Boyer | G06F 11/203 714/4.11 |
| 2008/0046538 A1 | 2/2008 | Susarla et al. | |
| 2008/0082623 A1 | 4/2008 | Michael et al. | |
| 2008/0201694 A1 | 8/2008 | Goldberg et al. | |
| 2009/0327798 A1 | 12/2009 | D'Amato et al. | |
| 2011/0307886 A1 * | 12/2011 | Thanga | G06F 9/5077 718/1 |
| 2013/0080559 A1 * | 3/2013 | Rao | H04L 67/1097 709/208 |
| 2013/0185408 A1 | 7/2013 | Ngo | |
| 2014/0081927 A1 * | 3/2014 | Lipcon | G06F 17/30197 707/692 |

(Continued)

OTHER PUBLICATIONS

International Search Report and Written Opinion of the International Searching Authority; dated Apr. 10, 2015; PCT/US2015/025263.

*Primary Examiner* — Sargon N Nano
*Assistant Examiner* — Christopher B Robinson
(74) *Attorney, Agent, or Firm* — Martensen IP

(57) ABSTRACT

A system and associated methodology for sharing a common data storage medium in a computer cluster is hereafter disclosed. Each server within the cluster includes a processor, an operating system, a stand-alone file system and a cluster management system. Moreover, the data storage medium is configured to store data usable by each of the servers within the server cluster. The cluster management system communicates with each stand-alone file system to coordinate access among the plurality of servers to the data storage medium.

17 Claims, 6 Drawing Sheets

(56) References Cited

U.S. PATENT DOCUMENTS

2014/0095459 A1\* 4/2014 Eshel ................ G06F 17/30079
707/703
2014/0095644 A1 4/2014 Dharmalingam et al.

\* cited by examiner

COORDINATED AND HIGH AVAILABILITY STORAGE ACCESS

RELATED APPLICATION

The present application relates to and claims the benefit of priority to U.S. Provisional Patent Application No. 62/051,373 filed Sep. 17, 2014 which is hereby incorporated by reference in its entirety for all purposes as if fully set forth herein.

BACKGROUND OF THE INVENTION

Field of the Invention

Embodiments of the present invention relate, in general, to application virtualization and, more particularly, to access to data storage independent of a cluster file system.

Relevant Background

It is unclear when computer clusters were first formed. Most believe that it occurred when early computer users found that they could not fit all their work on one computer and then began linking them together. By the mid 60s, it became widely recognized that forming a computer cluster provided significant processing advantages. Cluster computing typically connects a plurality of computing nodes to gain greater computing power and better reliability using low or lower cost computers. Connecting a number of computers or servers via a fast network can form a cost effective alternative to a single high performance computer. In cluster computing, the activities of each node (computer/server) in the cluster are managed by a clustering middleware that sits atop each node. This enables a user to treat the cluster as one large, cohesive computer.

A server cluster is a group of at least two independent computers (servers) connected by a network and managed as a single system in order to provide high availability of services for clients. Server clusters include the ability for administrators to inspect the status of cluster resources, and accordingly balance workloads among different servers in the cluster to improve performance. Such manageability also provides administrators with the ability to update one server in a cluster without taking important data and applications offline. As can be appreciated, server clusters are used in critical database management, file and intranet data sharing, messaging, general business applications, and the like.

Server clusters come in all shapes and sizes, but they are generally either asymmetric clusters or symmetric clusters. In an asymmetric cluster, a standby server exits only to take over for another server in the event of failure. This type of cluster provides high availability and reliability of services, but does so at the cost of having redundant and unused capability. The standby server performs no useful work and is either as capable or more capable than the primary server. In a symmetric server cluster, every server in the cluster preforms some useful work and each server in the cluster is the primary host for a particular set of applications. If a server fails, the remaining servers continue to process the assigned set of applications as well as picking up new applications from the failed server. Symmetric server clusters are more cost effective but, in the event of a failure, the additional load on the working servers can make them fail as well, leading to the possibility of a cascading failure.

On each server, there is one or more instantiations of various applications. Underlying each of these applications is a database engine such as Microsoft Transacted Structured Query Language or T-SQL (commonly known as SQL server). T-SQL is a special purpose programming language designed for managing data in relational database management systems. Originally built on relational algebra and tuple relational calculus, its scope includes data insert, query, update and delete functionality, schema creation and modification, and data access control. Other relational alternatives to SQL include .QL, 4D Query Language, Datalog, URL based query method, IBM Business Systems 12, ISBL, JPQL, Object Query Language, UnQL, QBE, and the like.

SQL or SQL server is a popular database engine that servers use as a building block for many larger custom applications. Each application built using SQL Server (or the like) typically communicates with a single instance of the database engine using that server's name and Internet Protocol address. Thus, servers with many applications depending on SQL server to access a database must normally run an equal number of instances of SQL server. In most cases, each instance of SQL server runs on a single node within the server cluster, each with its own name and address. If the node (server) that is running a particular instance of SQL server fails, the databases are unavailable until the system is restored on a new node with a new address and name. Moreover, if the node becomes heavily loaded by one or more applications, the performance of the database and other applications can be degraded.

As mentioned, cluster computing relies on centralized management that enables the nodes to be orchestrated as shared servers. Cluster systems are commonly used in web-service support (web servers) or computation intensive applications that involve scientific calculations such as computational fluid dynamics. In each case, the "load-balancing" is performed to manage the work-share to achieve better performance.

Highly available computer clusters (failover clusters) are used to improve the reliability of the cluster approach. In such architecture, redundant nodes, or nodes that are not fully utilized, exist that are capable of accepting a task from a node or component that fails. High availability clusters attempt to prevent single point failures. As one of reasonable skill in the relevant art can appreciate, the establishment, configuration, and management of such clusters is not trivial.

There are numerous cluster approaches, but in a typical system, each computer utilizes identical operating systems, often operating on the same hardware, and possesses local memory and disk space storage. But the network may also have access to a shared file server system that stores data pertinent to each node as needed.

A cluster file system or shared file system enables members of a server cluster to work with the same data files at the same time. These files are stored on one or more storage disks that are commonly assessable by each node in the server cluster. A storage disk, from a user or application perspective, is a dumb device that stores data. Each disk has a set number of blocks from which data can be read or to which data can be written. For example, a storage disk can receive a command to retrieve data from block 1234 and send that data to computer A. Alternatively, the disk can receive a command to receive data from computer B and write it to block 5678. These disks are connected to the computing devices issuing instructions via SCSI, IDE, FDDI, and similar interfaces. Storage disks do not create files or file systems; they are merely repositories of data residing in blocks.

Operating systems operating on each node include a file system that creates and manages files and file directories. It is these systems that inform the application where the data is located on the storage disk. The file system maintains some sort of table (often called a file access table) that associates logical files with the physical location of the data, i.e. disk and block numbers. For example, File ABC is found in Disk 1, blocks 1234, 4568, 3412 and 9034, while File DEF is found at Disk 2, blocks 4321, 8765 and 1267. The file system manages the storage disk. Thus when an application needs File ABC, it goes to the file system and requests File ABC. The file system then retrieves the data from the storage disk and delivers it to the application for use.

As one of reasonable skill in the relevant art will appreciate, the description above is rudimentary and there are multiple variations and adaptations to the architecture presented above. A key feature of the system described above, however, is that all of the applications running on an operating system use the same file system. By doing so, the file system guarantees data consistency. For example, if File ABC is found in, among others, block 1234, File DEF will not be allocated to block 1234 to store additional data unless File ABC is deleted and the blocks 1234 are released.

When multiple computers or nodes in a server cluster need access to the same data, data consistency is a prime concern. One approach known in the prior art to address this concern is referred to as a network storage system or NAS, Network Attached Storage. In such a system, a file server acts as a buffer between the nodes and the storage disk(s). In essence, the file server is a common file system for the cluster. The file server receives one or more requests from an application running on a node and acts much like an internal file system to write or retrieve data from the storage disk(s). Indeed the only real difference is that the requests are transmitted via a network rather than an internal bus. Again, data consistency is guaranteed since only the file server has access to the physical storage disk.

A single file server, however, is clearly a limitation to an otherwise flexible cluster of computer nodes. Another approach to common data storage is to connect a plurality of storage devices (disks) to a plurality of computing nodes. Such a Storage Area Network (SAN) enables any computing node to send disk commands to any disk. But such an environment creates disk space allocation inconsistency and file data inconsistency. For example, two computers can independently direct data to be stored in the same blocks. These problems make it impossible to use shared disks with a regular file system.

A cluster file system resolves these problems by enabling a multi-computer architecture (computing cluster) to share a plurality of storage disks without having the limitation of a single file system server. Such a system synchronizes the file allocation table (or the like) resident on each node so that each node knows the status of each storage disk. The cluster file system communicates with the file system of each node to ensure that each node possesses accurate information with respect to the management of the storage disks. The cluster file system therefore acts as the interface between the file systems of each node while applications operating on each node seek to retrieve data from and write data to the storage disks.

Applications can also operate in a virtual environment that is created on top of one or more nodes using the same approach to access data. One of reasonable skill in the relevant art will recognize that virtualization, broadly defined, is the simulation of the software and/or hardware upon which other software runs. This simulated environment is often called a virtual machine ("VM"). A virtual machine is thus a simulation of a machine (abstract or real) that is usually different from the target (real) machine (where it is being simulated on). Virtual machines may be based on specifications of a hypothetical computer or they can emulate the computer architecture and functions of a real world computer. There are many forms of virtualization, distinguished primarily by the computing architecture layer, and virtualized components, which may include hardware platforms, operating systems, storage devices, network devices, or other resources.

Application or process virtualization includes autonomic computing. Autonomic computing is a scenario in which the computing environment is able to manage itself based on perceived activity. The usual goal of application or process virtualization is to centralize administrative tasks while improving scalability and overall hardware-resource utilization. This type of parallelism tends to reduce overhead costs and it differs from multitasking, which involves running several programs on the same operating system.

Hardware virtualization or platform virtualization refers to the creation of a virtual machine that acts like a real computer with an operating system. Software executed on these virtual machines is separated from the underlying hardware resources. For example, a computer that is running an operating system, such as MICROSOFT WINDOWS®, may host a virtual machine that looks like a computer with using a different operating system, such as the UBUNTU LINUX® operating system.

In hardware virtualization, the host machine is the actual machine on which the virtualization takes place, and the guest machine is the virtual machine. The words "host" and "guest" are used to distinguish the software that runs on the physical machine from the software that runs on the virtual machine. The software or firmware that creates a virtual machine on the host hardware is sometimes called a "hypervisor."

In order to provide the virtualization stack described above, a shared storage scheme is typically required. One suitable approach to shared storage is a disk or set of disks that are access-coordinated to the servers participating in a cluster. One such system is MICROSOFT CLUSTER SERVER SOFTWARE™ or MSCS. MICROSOFT CLUSTER SERVER SOFTWARE™ requires strict adherence to a Hardware Compatibility List ("HCL") that demands each server possess the same edition and version of the operating system and licensing requirements (i.e. SQL Server Enterprise vs. SQL Server Standard). However, the complex implementation and licensing cost to such systems can be a major roadblock for most enterprises.

When HP PolyServe or the like is used to coordinate access to data, the failover system requires a cluster file system (i.e. PSFS). Recall that a cluster file system is a specialized file system (e.g. Melio FS, PSFS, GPFS, etc.) that is shared between the nodes by being simultaneously mounted on multiple servers allowing concurrent access to data. Cluster file systems are complex and require significant expenditure of time and capital resources to set up, configure, and maintain.

What is needed, therefore, is a system that enables application virtualization and failover without the requirements of a specific cluster file system such as PSFS, MelioFS or a highly restrictive and expensive clustering solution such as MSCS. Additional advantages and novel features of this invention shall be set forth in part in the description that follows, and in part will become apparent to those skilled in the art upon examination of the following specification, or may be learned by the practice of the invention. The advantages of the invention may be realized and attained by means of the instrumentalities, combinations, compositions, and methods particularly pointed out in the appended claims.

SUMMARY OF THE INVENTION

A system and associated methodology for sharing data in a computer cluster is hereafter disclosed. According to one embodiment of the present invention a plurality of servers are configured into a server cluster and coupled to a common data storage medium. Each server within the cluster includes a processor, an operating system, a local stand-alone file system and a cluster management system. Moreover, the data storage medium is configured to store data usable by each of the servers within the server cluster. The cluster management system communicates with each storage device stand-alone file system to coordinate access among the plurality of servers to the data storage medium.

In other embodiments of the invention each server within the cluster is configured to host one or more application instances on either the server itself of a virtual host operating on top of the server. The cluster management system operates on top of each server and includes, in another embodiment, a storage monitor engine, a local monitor engine and a cluster monitor engine.

The storage monitor engine further includes an enumerator that identifies and maintains a list of storage devices such as disks, tapes, optical drives and the like associated with the data storage medium. The storage monitor also includes a synchronization manager that synchronizes configurations among existing servers within the server cluster and as the number of servers within the cluster change. A fencing engine, also a component of the storage monitor, isolates access to storage devices (disks) associated with the data storage medium to only the one server within the server cluster that is actively engaged with the storage device.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to another embodiment of the present invention data access to a shared data storage medium by a plurality of servers in a server cluster, each operating a discrete stand-along file system, can be achieved by identifying one or more storage devices that are associated with the shared data storage medium, enumerating the identified storage devices, coordinating among the plurality of servers with the server cluster access to each storage device and isolating access to the storage devices to only the server actively engaged with that storage device.

Access to a shared data storage medium can also be gained, according to one embodiment of the present invention, when two or more of the servers with the servers within the server cluster possess different operating systems or utilize different hardware components. The present cluster management system and associated methodology coordinates the actions of multiple stand-along file systems existing on diverse servers to replace the need for a cluster file system while still providing access to a shared data storage medium. These and other advantages of the present invention are more fully described hereafter by way of example.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
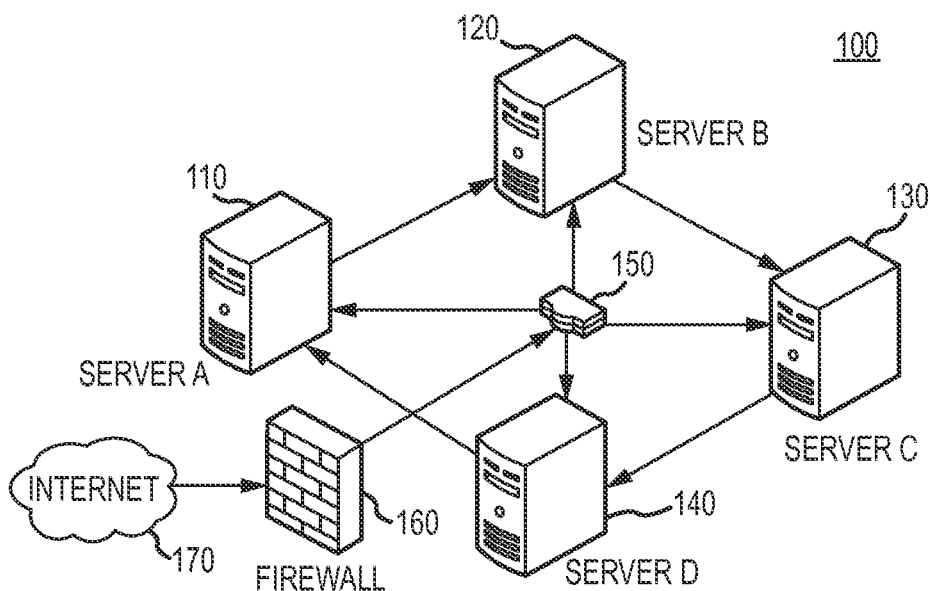
FIG. 1 shows a typical networked computer environment as would be known to one of reasonable skill in the relevant art.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Presented below by way of example is a system and associated methodology for coordinated and high availability access to data in a computer cluster environment without the need for a shared cluster file system. One or more embodiments of the present invention enables any server, regardless of its associated Hardware Compatibility List ("HCL"), Operating System (version or edition), or location, to be a member server of a computer cluster and to be capable of hosting/virtualizing an application while accessing shared data. The present invention takes any shared disk and coordinates read-write access to any node in a computer cluster as needed by any application instance.

One embodiment of the present invention turns a stand-alone file system such as the New Technology File System ("NTFS") into an abstract, coordinated file system for shared data access. The invention creates a shared data platform for application instances (virtual or physical) in a diverse computer cluster. One or more embodiments of the present invention eliminate strict hardware compliance and expensive enterprise licensing while consolidating and providing a high availability platform for application instances across multiple operating systems.

While the present invention is often described herein in terms of SQL Server instances, MSCS, PSFS, etc., one skilled in the relevant art will recognize that the concepts presented herein are equally applicable to all types of server/application systems such as Exchange, Oracle, SharePoint, Informix, and the like. Moreover, embodiments of the present invention are hereafter described in detail with reference to the accompanying Figures. Although the invention has been described and illustrated with a certain degree of particularity, it is understood that the present disclosure has been made only by way of example, and that those skilled in the relevant art can resort to numerous changes in the combination and arrangement of parts without departing from the spirit and scope of the invention.

The following description includes various specific details to assist in understanding the invention, but these descriptions are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. By the term "substantially," it is meant that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terminology used herein is for the purpose of describing particular embodiments only and is not intended to be limiting of the invention. As used herein, the singular forms "a," "an," and "the" are intended to include the plural forms as well, unless the context clearly indicates otherwise. Thus, for example, reference to "a component surface" includes reference to one or more of such surfaces.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms such as those defined in commonly used dictionaries should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting," "mounted" etc., another element, it can be directly on, attached to, connected to, coupled with, or contacting the other element, or intervening elements may also be present. In contrast, when an element is referred to as being, for example, "directly on," "directly attached" to, "directly connected" to, "directly coupled" with, or "directly contacting" another element, there are no intervening elements present. It will also be appreciated by those of skill in the art that references to a structure or feature that is disposed "adjacent" another feature may have portions that overlap or underlie the adjacent feature.

For the purpose of the present invention, the following terms are defined to add clarity and prevent any confusion or misconception.

Internet Protocol (IP) is the principal communications protocol used for relaying datagrams (also known as network packets) across a network using the set of communications protocols. Generally, it is the most popular protocol stack for wide area networks and is commonly known as TCP/IP, because of its most important protocols. IP is responsible for routing packets across network boundaries and is the primary protocol in the Internet Layer of the Internet Protocol Suite. For this purpose, IP defines datagram structures that encapsulate the data to be delivered. It also defines addressing methods that are used to label the datagram source and destination.

New Technology File System (NTFS) is the standard and proprietary file system developed by Microsoft for the Windows line of operating systems including for example Windows NT, Windows XP, and Windows Server.

Melio File System (MelioFS) is proprietary cluster file system developed by Sanbolic for the Windows line of operating systems including for example Windows NT, Windows XP, and Windows Server.

PolyServe File System (PSFS) is the proprietary cluster file system developed by PolyServe, currently owned by Hewlett Packard for Windows and Linux operating systems.

Small Computer System Interface (SCSI) is a set of standards for physically connecting and transferring data between computers and peripheral devices. The SCSI standards define commands, protocols, and electrical and optical interfaces. SCSI is most commonly used for hard disks and tape drives, but it can connect a wide range of other devices, including scanners and CD drives, although not all controllers can handle all devices. The SCSI standard defines command sets for specific peripheral device types; the presence of "unknown" as one of these types means that in theory it can be used as an interface to almost any device, but the standard is highly pragmatic and addressed toward commercial requirements.

SCSI-3 Persistent Reservation (SCSI-3 PR) is used to control access to a shared SCSI device/disk. An initiator sets a reservation on a Logical Unit Number (LUN) and prevents other initiators from accessing the same LUN. SCSI-3 reservations are persistent across SCSI bus resets and support multiple paths from a server to a device/disk.

SCSI-3 Primary Commands (SPC-3) is the third-generation command standard used to interface with SCSI-3 devices.

MICROSOFT CLUSTER SERVER SOFTWARE™ (MSCS) is software designed to allow servers to work together as a computer cluster and to provide failover and increased availability of applications, or parallel calculating power in case of high-performance computing (HPC) clusters (as in supercomputing), that allows servers to work together as a computer cluster.

In object-oriented programming, an instance (or instantiation) is an occurrence or a copy of an object, whether currently executing or not. Instances of a class share the same set of attributes, yet will typically differ in what those attributes contain. For example, a class "Employee" would describe the attributes common to all instances of the Employee class. For the purposes of the task being solved, Employee objects may be generally alike, but vary in such attributes as "name" and "salary." The description of the class would itemize such attributes and define the operations or actions relevant for the class, such as "increase salary" or "change telephone number." One could then talk about one instance of the Employee object with name="Jane Doe" and another instance of the Employee object with name="John Doe".

Also, in object-oriented programming, a class is a construct that is used as a blueprint to create instances of itself. This is referred to as class instances, class objects, instance objects, or simply objects. A class defines constituent members, which enables these class instances to have state and behavior. Data field members (member variables or instance variables) enable a class object to maintain state. Other kinds of members, especially methods, enable a class object's behavior. Class instances are of the type of the associated class.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

Figure 2:
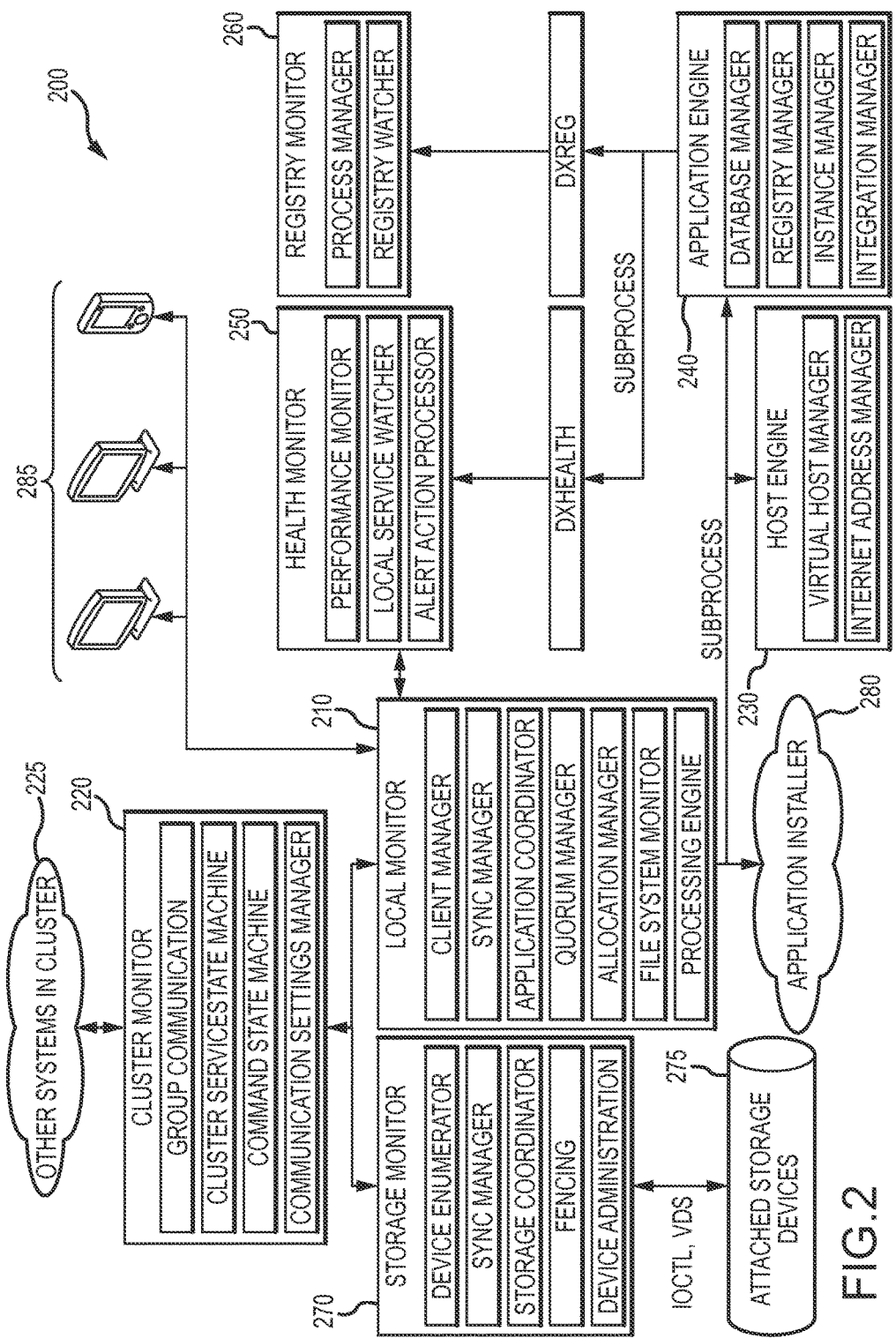
FIG. 2 is a high-level logical architecture of a system for coordinated and high availability storage access in a computer cluster environment according to one embodiment of the present invention.

FIG. 2 is a high-level logical diagram of components residing on each node of the server cluster that, according to one embodiment of the present invention, enables cluster aware application virtualization and coordinated access to shared data. According to one embodiment of the present invention, each node in a server cluster includes, among other things, a cluster monitor engine 220, a local monitor engine 210, a host engine 230, a storage monitor engine 270, and an application engine 240. In other embodiments of the present invention, additional components such as a health monitor 250, the registry monitor 260, and an application installer 280 are included on each node. Each node further includes failover policies and various user interfaces 285, or clients by which a solution illustrator can gain the status of the server cluster and make configuration changes. As shown in FIG. 2, clients 285 communicate with the local monitor engine 210 via a wire protocol used for sending commands, responses, and events.

The client interface 285 may represent computing or communication devices providing user access or interface to the cluster management system 200 of the present invention. Each client interface 285 may include any hardware, software, firmware, or combination thereof for supporting user access or control of the cluster system. The client interface 285, for example, may represent desktop computers, laptop computers, personal digital assistants, pagers, mobile telephones, or other devices. One may note that a wide variety of client interface systems 285 may be used to interact with the computer cluster architecture, and that these interactions may vary depending on the type of interface used by a user.

In one embodiment of the present invention, the local monitor engine 210 is responsible for receiving and forwarding requests from user interfaces 285 to the host engine 230 and cluster monitor engine 220. The local monitor engine 210 further includes a client manager that handles incoming client requests and passes these requests to the processing engine for maintaining client connections. The processing engine parses and carries out client requests by forwarding the requests to the host engine 230 and/or the cluster monitor engine 220. The local monitor engine 210 also includes a synchronization manager that keeps the state and configuration files synchronized across the entire cluster. Accordingly, when a command is received by the user interface 285 to add or form a virtual host, the synchronization manager relays this information to the cluster monitor engine so that the configuration files on other nodes can be updated.

The allocation Manager monitors the set of applications active on each system, and guides automatic application placement decisions based on configured resource requirements and availability. The file system monitor monitors the availability of file system paths for applications, and reports the state to the cluster coordinator. Finally, the processing engine parses and carries out client requests by forwarding the requests to host engine, application engine, and/or sync manager.

The quorum manager located within the local monitor determines whether the active cluster has a quorum based on its configuration. The quorum manager acts to shut down an active application if no quorum exists. For example, if two sub-groups of the same cluster are able to communicate among themselves, but unable to communicate with one another as a group, they will form two independent clusters. The quorum manager ensures that only one of those clusters attempts to start applications.

The allocation manager monitors the set of applications active on each system, and guides automatic application placement decisions based on configured resource requirements and availability. The file system monitor monitors the availability of file system paths for applications, and reports the state to the cluster monitor and the storage monitor. Finally the processing engine parses and carries out client requests by forwarding the requests to host engine, application engine, and/or sync manager.

The cluster monitor engine 220 is the primary means of communication between other nodes in the server cluster. The cluster monitor engine is responsible for receiving and forwarding requests from other cluster monitors to the local monitor engine 210 and storage monitor engine 270 at each node. The cluster monitor 220, which is coupled to the local monitor 210 and the storage monitor 270, is responsible for establishing communication between all available systems participating in a cluster, as well as monitoring system availability, providing virtual synchrony through its coordinator, monitoring and synchronizing the state of cluster services, and relaying commands between cluster service members. From the point of view of the cluster monitor, a cluster service is an external software component participating in a named group. The cluster monitor informs all cluster services participating in the same group of each other's presence, as well as any changes that may occur to that group. In that manner, the local monitor 210 and storage monitor 270 components function as cluster services.

In a preferred embodiment of the present invention, the cluster monitor is comprised of a group communication module, a cluster service state machine, a command state machine, and a communications-setting manager.

The group communication module establishes communication with all available systems involved in the cluster while monitoring system availability and communication channels as well as electing a system as the cluster coordinator.

The cluster service state machine monitors availability of cluster services, processes changes to the set of available cluster services, and informs active cluster service components running on each system of the current service membership.

The command state machine monitors the state of relay commands submitted by various cluster services, ensuring the consistent ordering of relayed commands and the reliability of responses sent back to the issuers of those commands.

The communication settings manager maintains administratively configured details of the cluster, including the list of systems, their network addresses, and cryptographic secrets. The manager also manages the process of adding and removing systems in an active cluster and synchronizes the configuration between systems as cluster membership changes.

The storage monitor engine 270 works with the cluster monitor engine 220 and the local monitor engine 210 to manage access to the repository of shared data house on one or more storage devices 275. The storage monitor enables the computer cluster to take an existing stand-alone file system and turn it into a coordinated storage system. Access to a data store can be coordinated from any node within the cluster.

In this example, the storage device may be used to store various information used, generated, or collected by an application instance operating on a node within the cluster. A single disk or storage device may store information for one or multiple application instances from one or multiple nodes, and/or multiple storage devices may store information for one or multiple computing devices or application instances. The storage devices 275 may include any hardware, software, firmware, or combination thereof for storing and facilitating retrieval of information. The storage devices may also use any variety of data structures, arrangements, and compilations to store and facilitate retrieval of information.

The storage monitor engine also includes a synchronization manager that keeps the state and configuration of files synchronized across the cluster and works along with the synchronization manager of the local monitor engine 210 to maintain file and application consistency.

According to one embodiment of the present invention, the storage monitor 270 is also responsible for maintaining the state of available storage devices on each system, and for reconfiguring the storage devices to satisfy application requirements. In one exemplary embodiment, the storage monitor includes a device enumerator, a sync manager, a storage coordinator, a fencing module, and a device administration engine.

The device enumerator identifies and maintains a list of disk and volume devices present on the local system, and actively monitors changes to that list. The sync manager maintains the administrative configuration of known, managed disk devices and synchronizes the configuration among the nodes of the cluster as cluster membership changes. The sync manager ensures that every node in the cluster sees the same data storage environment.

The storage coordinator executes cluster-wide administrative commands and maintains cluster invariants related to storage devices. For example, if a user requests a volume be created, the storage coordinator determines the best system on which to create the volume, ensures that the target disk devices are made available on that system, and then forwards the request to that system. The coordinator signals other nodes in the cluster to determine which node, which application, has control of particular blocks of data. The storage coordinator is the referee for when multiple nodes/applications seek control of the same block of data or disks.

The fencing module blocks access to storage devices for systems that may have previously had access to them, but are no longer part of the active cluster. While the device administration engine manages device reconfiguration requests, including setting such devices online or offline, and creates/deletes/extends/shrinks file system volumes, it is the fencing module that prevents other nodes from accessing a particular storage disk when it is actively engaged by another node.

Accordingly, the present invention utilizes a coordinated shared file system where every server in the cluster can read/write to the same blocks of disk without the constraint imposed by SCSI reservation, but only in a coordinated manner. For any applications that support "Shared Everything" architecture, the invention can be extended to provide a cheaper and more efficient load-balanced platform for the applications.

The local monitor engine 210 is further in communication with an application engine 240. The application engine 240 is responsible for establishing and managing an application instance such as SQL server (or other virtualized application). The local monitor engine 210 also invokes the application engine 240 in response to requests. Once an application is instantiated, the application engine 240 exits to manage the instantiation. As shown in FIG. 2, the application engine includes a database manager that maintains and manages database files for each instance. A registry manager (apart from the registry monitor) further maintains and manages the registry values for each virtualized instance, and an instance manager that manages and maintains instance configurations is stored on each disk. Lastly, an integration manager handles instance registration with the registry and health monitor engines.

In another embodiment of the present invention, each node of the server cluster further includes a health monitor 250 and a registry monitor 260. The health monitor 250, also coupled to the application engine 240, monitors application health as well as signals a failover or failback event. The health monitor 250 includes a performance monitor, a local service watcher, and an alert action processor. The performance monitor monitors CPU, memory, and I/O utilization of the system as well as the relevant application processes.

The service watcher monitors application service health and raises events based on registration policy. Lastly, the alert action processor sends emails and invokes scripts in response to alerts and application conditions.

The registry monitor 260, in communication with the application engine 240, monitors registry changes and maintains these changes to nonvolatile storage. The registry monitor also runs as a system service daemon for additional remote procedure requests. The duties of the registry monitor include handling incoming requests and maintaining a registration list, as well as carrying out registry registration requests and events based on established registration policies.

The present invention (referring generally to FIG. 2) establishes a system 200 for application virtualization and shared data management. On each node of a server cluster, a local monitor engine communicates with, among other things, a cluster monitor engine, a storage monitor engine, and a host engine in order to form one or more environments on which a virtual version of an application can be formed. Each virtual application resides on a virtual host that possesses a unique host name and IP address.

In the system as shown in FIG. 2, the local monitor 210 communicates with the cluster monitor 220 to ensure all servers in the cluster are aware of a new cluster application, so that they can correctly participate in the cluster quorum. The cluster monitor 220 communicates with the storage monitor 270 to ensure proper storage access is coordinated, i.e. the active node is allowed to have full read-write access, while other member servers are blocked from accessing the same storage blocks on disks (in this embodiment). The local monitor 210 communicates with the host engine 230 to establish and bind the virtual host and virtual IP address to the local server if it is the active node. It then communicates with the application engine 240 to process and transform an instance of SQL Server (in this embodiment) into a cluster application that binds to the virtual host. To provide high availability for the application, the application engine 240 registers the application with the registry monitor 260 and the health monitor 250.

When there is a change in the local registry key of the application, the registry monitor 270 persists the change to a coordinated disk. This ensures the cluster, as a whole, will always have the latest image of the registry hive. If the application service fails or goes offline on the active server, the health monitor 250 will signal a failover with the local monitor 210. The local monitor 210 communicates with the cluster monitor 220 to forward the request to other remote cluster monitors 225. The remote cluster monitor 225 in turn forwards the request to their respective storage monitors and local monitors. Once the storage is fully coordinated, the remote local monitors then pass the request down to the respective host engine and application engine. If the remote server is the next available server of the virtual host, the remote host engine starts binding the virtual host and virtual IP to its network interface, and the remote application engine starts processing the application and registering it with the remote registry and health monitor.

One embodiment of the present invention provides a set of methods and systems to virtualize an application without the use of standard failover clustering or cluster file system. The present invention turns a stand-alone file system into a coordinated access file system and provides high availability for an application. A coordinated access file system is a stand-alone file system that guarantees only one active node in the cluster full read-write access to the storage blocks on disk at any one time. Using the present invention, neither a WSFC (or the like) nor cluster file system is needed; applications can be virtualized and quickly brought online on any nodes in the cluster once the file system is coordinated. Moreover, the present invention will support dynamic disks and volumes as a coordinated cluster resource.

Figure 3:
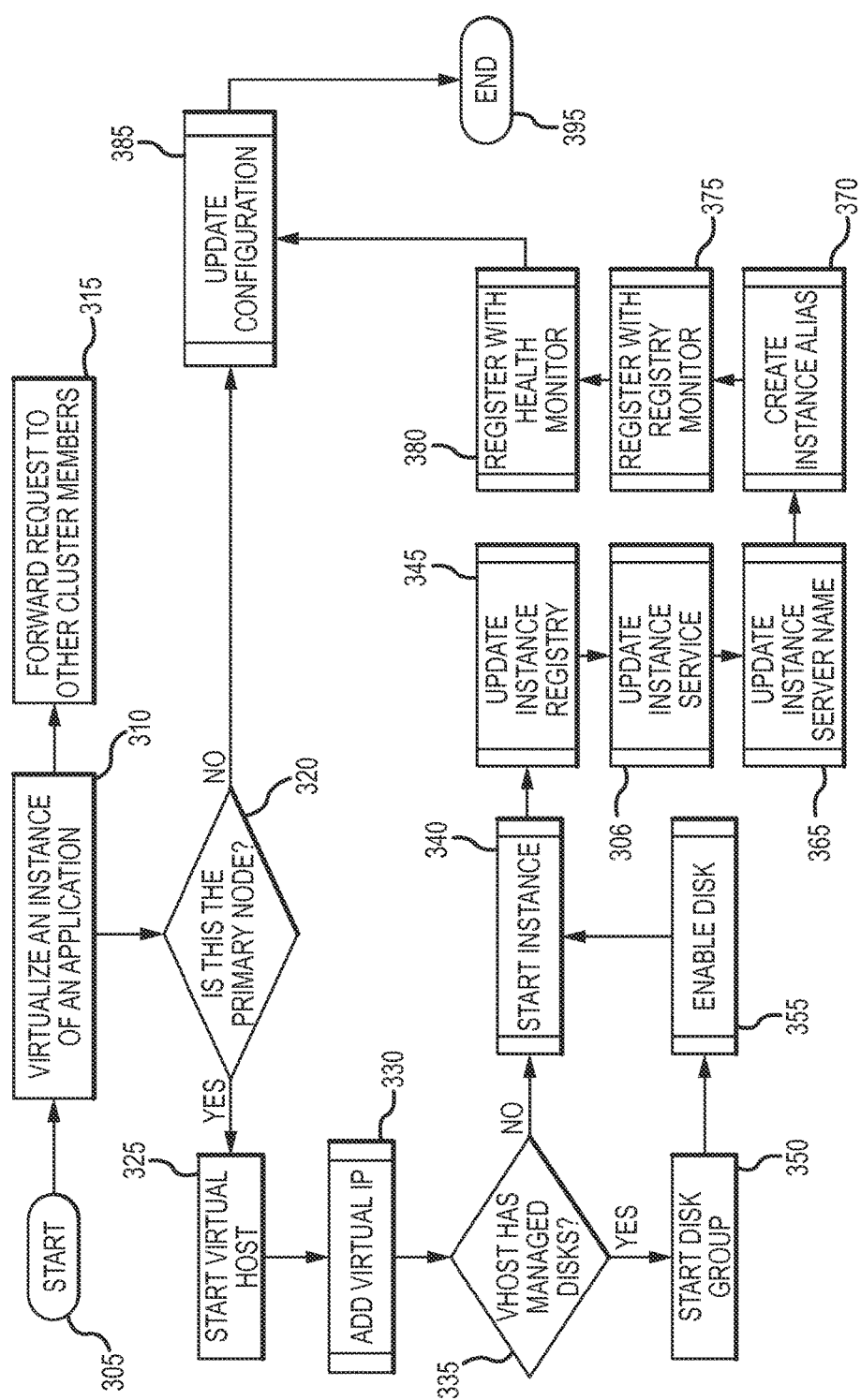
FIG. 3 is a flow chart of one method embodiment for instantiation of an application with coordinated and high availability storage access according to one embodiment of the present invention.

FIG. 3 presents a flow chart for establishing a virtual application instance having access to a coordinated shared data source. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

The process begins 305 with a request for the virtualization of an instance of an application 315. This request is conveyed not only amongst the components of the receiving node, but forwarded 315 to each other cluster monitor/node within the server cluster. If the receiving node is the primary node 320, then the nodes begin the process to establish the instantiation. When the request falls on a non-primary node, the configuration files are updated 385 to show the location of the instance.

At the primary node, the request to virtualize instantiation of an application is sent to both the application engine and the host engine. Upon arrival at the host engine, the request results in the addition of the virtual host 325 and the addition of a virtual Internet protocol address 330.

A query 335 is undertaken whether the virtual host has any managed disks. When the response to the inquiry is no, the application engine adds an instance 340 of the application to the virtual host and updates the instance registry 345. When the virtual host does possess managed disks, the designated server starts the disk group 350 and thereafter enables 355 the disk for data access so as to be under control of the cluster management system of the present invention 200. (See FIG. 4)

Thereafter, the instance service 360 is updated throughout the cluster environment. The instance server name is also updated 365 to align with the name of the virtual host, as is the Internet protocol address associated with the instantiation. An alias for the instantiation is created 370 and that alias is registered with the registry monitor 375 and the health monitor 380. With the instantiation complete, the application configuration is updated 385 and the existence of a new application is communicated to the rest server cluster, ending 395 the process.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As an application instance is created on top of a virtual host, it may include managed disks just as a physical server being added to the cluster would. According to one embodiment of the present invention, the disks are started and enabled by the cluster management system to ensure data consistency before the instantiation is established.

Figure 4:
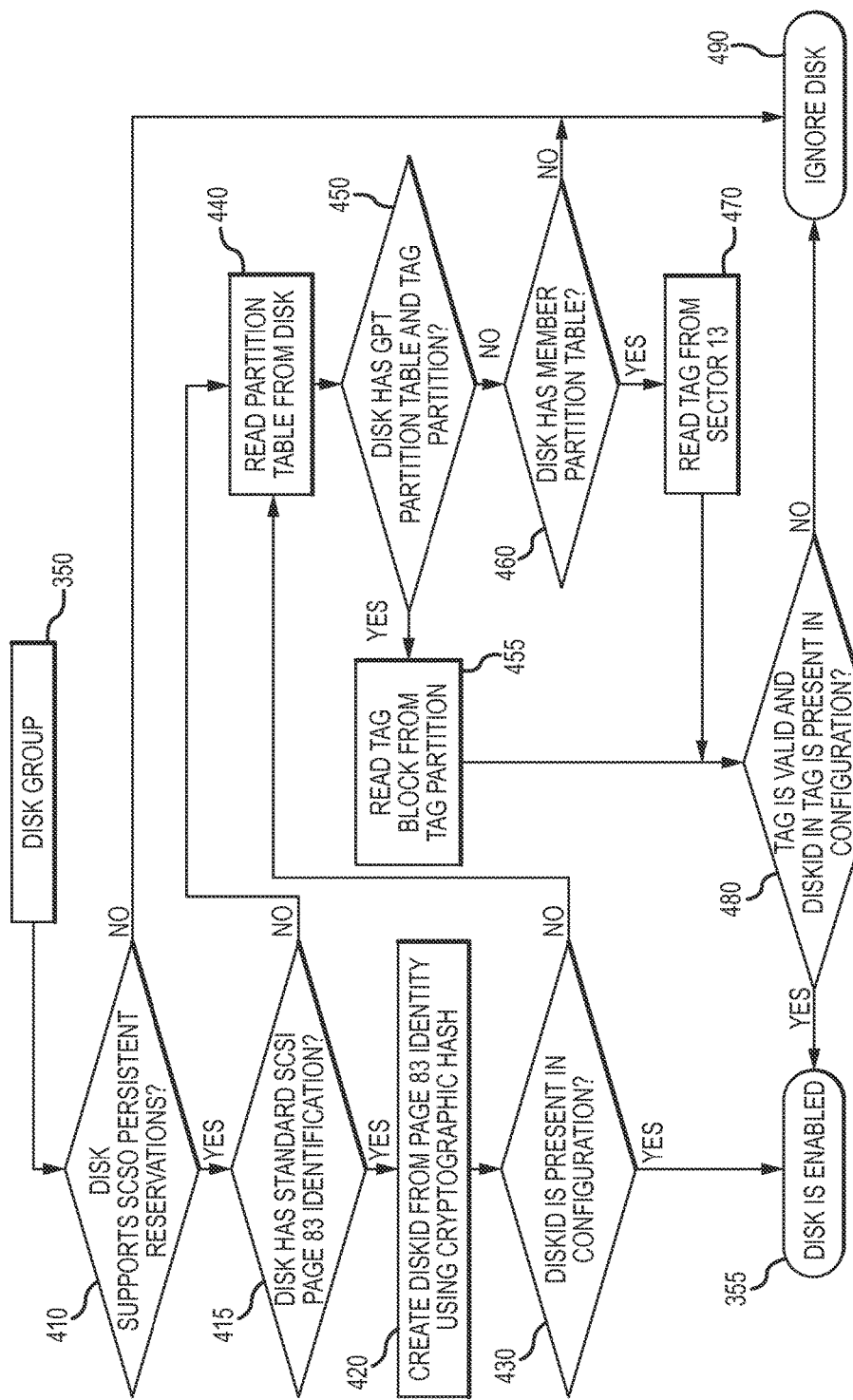
FIG. 4 is a flow chart for placing a disk under the control of a cluster management system of the present invention and available for use by the cluster, according to one embodiment of the present invention.

FIG. 4 is a flow chart of one embodiment for placing a disk under management control of the cluster management system of the present invention. The process begins with the recognition that a virtual host includes managed disks 335 and the disks are started 350. An inquiry is made as to whether the disks support SCSI persistent reservations 410. If the answer is no, the disks are ignored 490 from further consideration. If the answer is yes, an additional inquiry is made as to whether the disks use a standard SCSI page 83 identification schemes 415. If the disk does use a standard SCSI page 83-identity scheme, then a disk identification number ("DiskID") is created 420 from the page 83 identification schemes using a cryptographic hash. If the DiskID is present in the configuration files, the disk is enabled 355 and the instantiation of the application can proceed.

If the disk either does not use standard SCSI page 83 identification schemes, or if the DiskID is not present in the configuration files, the partitions of the disk must be read and recorded 440. Upon reading the partitions, it can be determined whether the disk uses, and has, a global unique identification partitions table 450. If the disk does possess such a table, tags associated with each block are read 455, validated 480, and recorded in the configuration table 480. Once they are read, validated, and configured, the disk is enabled 355.

If the disk does not support global unique identification partition values 450, an inquiry is made as to whether the disk has a member partition table 460. If the response is negative, the disk is ignored and the disk is not utilized 490. If the disk does possess a member partition table, the tag from the last partition, sector 13, is read 470 and the tab validated and presented for configuration 480. Once it is validated and configured, the disk is again enabled 355 and the instantiation can take place.

Figure 5A:
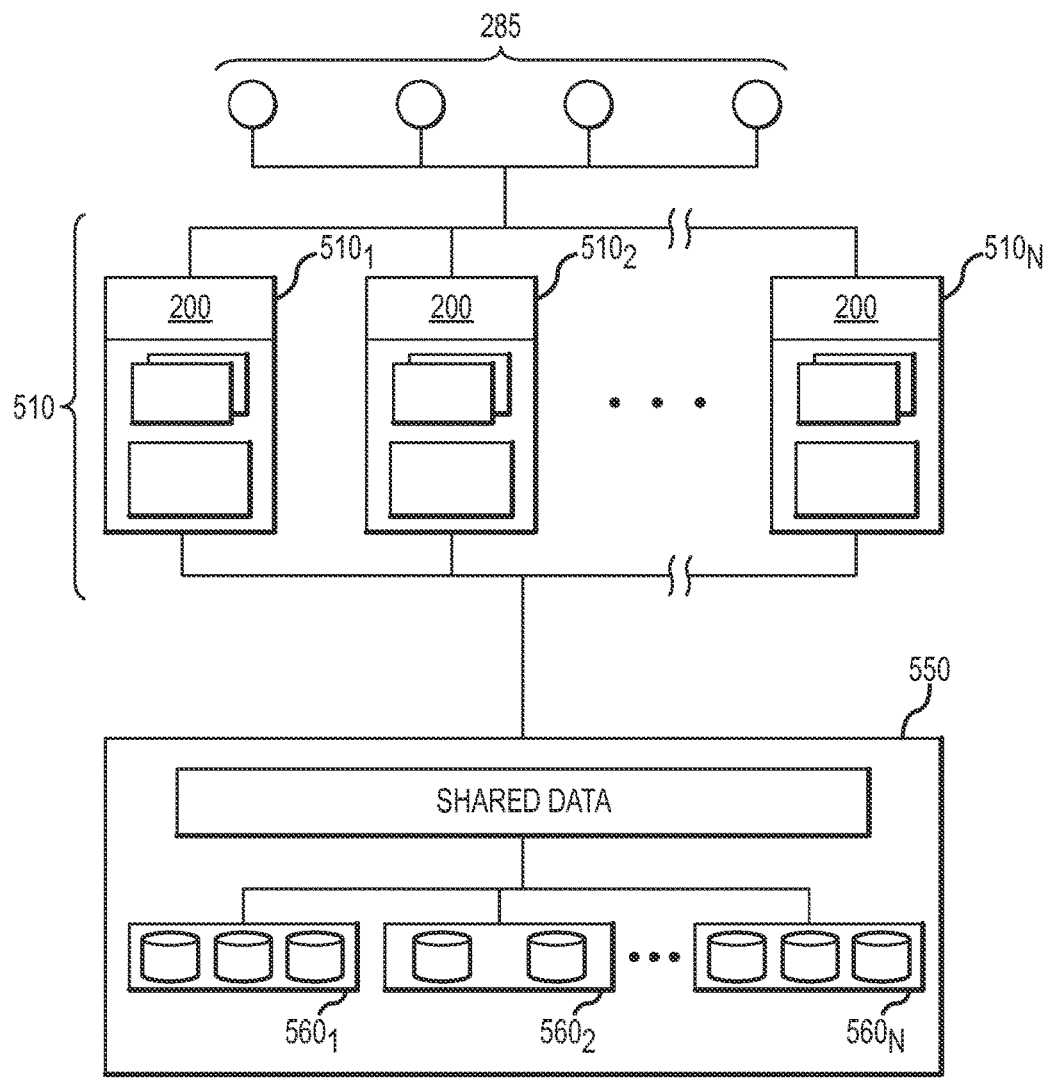
FIGS. 5A and 5B are high-level architectural diagrams of a computer cluster employing one embodiment of the coordinated and high availability storage access system of the present invention.

To better understand the significance of the present invention on cluster computing, consider the following example: FIG. 5A depicts a high-level view of a computer cluster with coordinated access to shared data according to one embodiment of the present invention. Client interfaces 285 are coupled to the cluster environment 510 that is comprised of a plurality of servers $510_1$ $510_2$, . . . $510_n$. The servers 510 are further coupled to shared data 550 housed in a plurality of storage disks/devices $560_1$, $560_2$, . . . $560_n$.

Each server 510 within the cluster includes the cluster management system 200 of the present invention. Thus each node includes a cluster monitor, storage monitor, local monitor, host engine, application engine, registry engine, and health engine. In each case, cluster monitors of each node communicate with the cluster monitors resident on the other node to coordinate the state of the cluster and to manage application instances, failover policies, and the like.

Figure 5B:
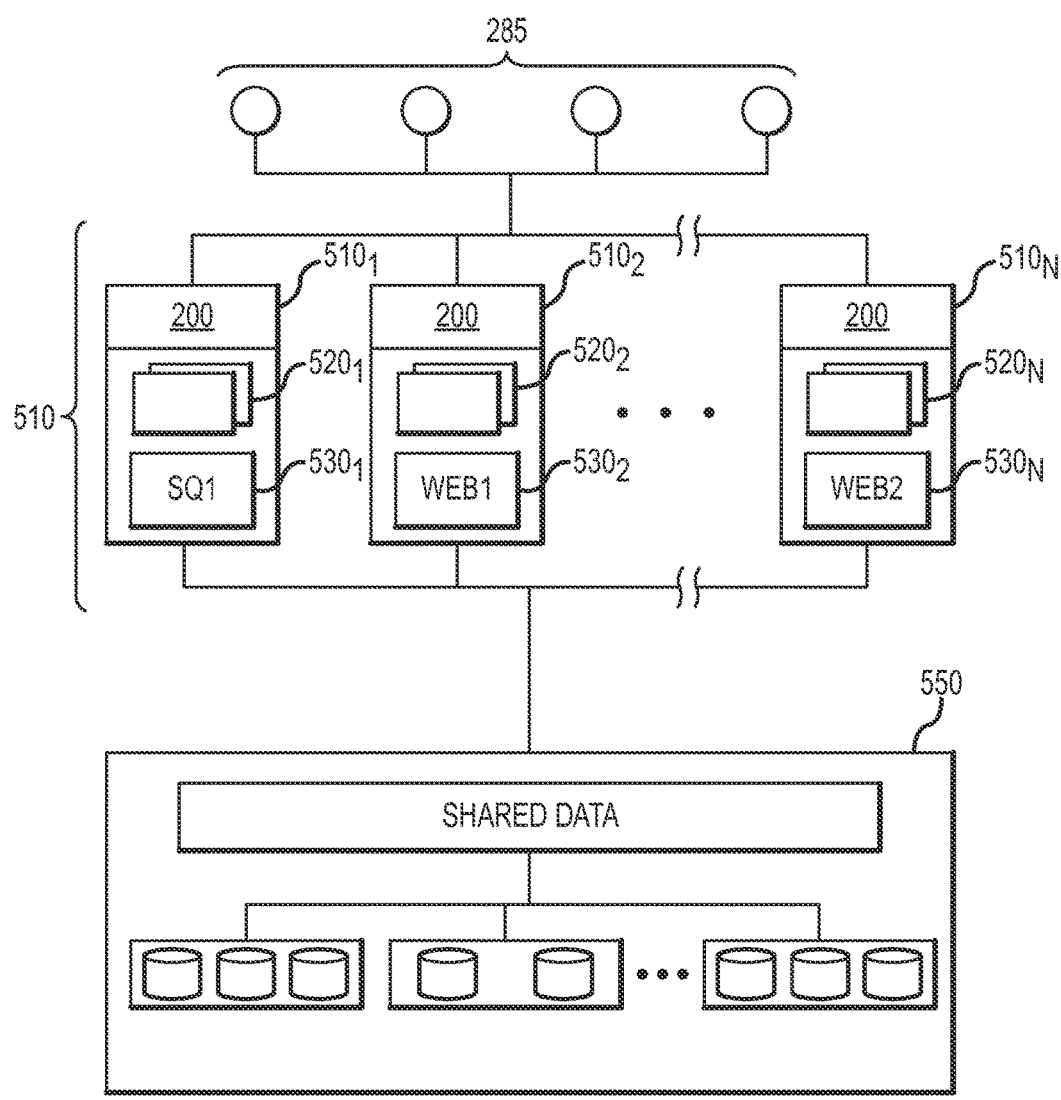

Turning to FIG. 5B, assume that an instance of SQL server $530_1$ has been instantiated on the first node $510_1$ and an instance of a Web application $530_2$ instantiated on the second node $510_2$. One of reasonable skill in the relevant art will appreciate that each node can be a physical or virtual machine, and that the instance of the application can reside on either a physical host or a virtual host. Moreover, each node can be a different platform running a different operating system. The first node $510_1$ can, for example be running Windows NT while the second node $510_2$ can be operating Linux or Unix. Each of these systems is associated with a stand-alone file system. Similarly, and continuing with the present example, another node $510_n$ can also include a different Web application $530_n$ running concurrently with the Web application running on a different node in the cluster.

A server cluster enables multiple applications to run on multiple computers with a high degree of availability and redundancy. Thus if one node fails, the application can be quickly turned over to another node without significant loss of the application's functionality. In this example, the web application $530_2$ running on the second node $510_2$ can quickly be moved to a different node if the second server begins to fail.

According to one embodiment of the present invention, each node has access to a shared repository of data 550. Within the repository, there is a plurality of storage disks $560_1$, $560_2$, . . . $560_n$. Each operating system 520 interacts with the shared storage 550 via the cluster management system 200. By doing so, the storage monitor within the cluster management system coordinates between the various nodes to determine which application has access to which disks.

Assume that the web application instance $530_2$ operating on the second node 4102 is seeking access to data housed on a particular disk $560_1$. Running concurrently, another web application instance $530_n$ running on a different node $510_n$ communicates a request through its application engine that it seeks access to data located on the same disk. The local monitor conveys that request to the cluster monitor and storage monitor which identifies that the disk on which the data resides is under the control of the different node. The other web application "owns" the disk and the storage monitor of the first disk have fenced out any other read/write access until the application releases its ownership. Once the other web application releases control of the disk, the other node (and its application) can gain control of the disk and the repository of data.

The result is data consistency. Data can only be read by and written to a single application. While other cluster file systems enable similar functionality, they require common operating systems and strict compliance with hardware compatibility lists to be operational. The present invention operates on top of different operating systems within a cluster to leverage and coordinate stand-alone file systems present within each operating system. The present invention taps native file system and shared storage technology to coordinate access to a pool of disk resources in a computer cluster. This pool of disk resources provides a foundation for storage containerization. Moreover, the storage containerization creates logical disk groups and volumes that may be allocated to multiple servers. This stands in contrast to the typical systems that either tether each server to specific physical storage devices, or implement a costly cluster file system. The logical disk groups of the present system are instantly mobile and presentable to any host within the cluster.

The storage manager of the present invention further supports both basic and dynamic volumes. Basic volumes span within a formatted partition on the same basic disk, while dynamic volumes span multiple dynamic disks. A basic disk can have up to 4 primary partitions or 3 primary partitions and 1 extended partition with up to 128 logical volumes in the extended partition. A basic disk cannot share of split data with other partitions or basic disks. A dynamic disk can have up to 2000 partitions and can be combined with other partitions or dynamic disks into a single dynamic volume. The storage manager of the present invention can convert a basic volume to a dynamic volume when the basic volume expands across two or more disks. Additionally, the storage manager of the present invention supports shrinking basic and dynamic volumes to reclaim unused space as necessary.

Microsoft Cluster Services (MSCS) supports basic volumes, which introduces challenges when the volumes require expansion. Basic volumes can only expand into adjacent and contiguous unallocated space on the same disk. Dynamic volumes are not supported without the approved Storage Foundation from Symantec. The present invention supports both basic and dynamic volumes and able to convert from one volume type to another as needed. Thus, volume expansion in the present invention has no limitation.

The present invention detaches application instances from a physical server, Virtual machine, or cloud server and its corresponding stand-alone file system. Using a virtual host, the present invention creates a unique network name/logical computer name and associated IP address, management metadata, and portable disk resources for each virtual container. The container forms a high level abstraction of a host name and IP address that allows enterprises to stack workloads without the overhead of stacking operating systems. The network name and IP address associated with an application are virtualized which enables flexibility and high availability. The instance gains access to shared-storage regardless of where it resides on the cluster.

The preset invention offers mobility and high availability to any application service, file share, or application instance. The prior art's limitations of strict compliance with configuration and hardware compatibility to become a member of a cluster is removed by the present invention. Workloads are instantly portable from any host to any other host by simply stopping and starting the application. Any plurality of servers can be a member of a cluster which removes the strict requirement that a member server run on the same operating system or be of the same hardware class.

According to one embodiment of the present invention, each server within a server cluster can operate essentially as a stand-alone server. Thus, cluster size is not a limiting factor. In comparison, the cluster file service of the prior art must be configured on at least one node of the cluster and it must run an enterprise version of a database application program such as SQL Server Enterprise. Even in this configuration the failover coverage is limited. The present invention removes these and other limitations.

Hardware compatibility lists are eliminated and no cluster file system is required to share data. The present invention supports multiple topologies including physical-to-physical, physical-to-virtual, physical-to-cloud, virtual-to-virtual, and virtual-to-physical, and virtual-to-cloud. Any stand-alone or workgroup server can be a member server using the present invention.

Upon reading this disclosure, those of skill in the art will appreciate still additional alternative structural and functional designs for a system and a process for coordinated and high availability storage access through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation, and details of the method and apparatus disclosed herein without departing from the spirit and scope defined in the appended claims.

An exemplary system for implementing the invention includes a general purpose computing device such as the form of a conventional personal computer, a server, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, and a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules, and other data for the personal computer. Although the exemplary environment described herein employs a commonly accessed storage environment having magnetic disks, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

While there have been described above the principles of the present invention in conjunction with coordinated and high availability storage access, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly, or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A system for shared data access, comprising:
a plurality of servers configured into a server cluster wherein each server includes a processor capable of executing instructions embodied as software, computer-readable memory including a plurality of software portions, an operating system, a local stand-alone file system, and a cluster management system wherein the cluster management system includes a local monitor engine, a cluster monitor engine and storage monitor engine having a device enumerator, wherein the local monitor engine is configured to form one or more virtual hosts and wherein one or more application instances operate on top of the one or more virtual hosts; and
a shared data storage medium, wherein the shared data storage medium is associated with a plurality of storage devices each having plurality of storage blocks, and wherein each of the storage blocks store data, are coupled to each of the servers within the server cluster, and operate as a stand-alone shared data storage medium whereby one of the plurality of software portions of the cluster management system is configured to communicate with each storage block of the stand-alone shared data storage medium and each application instance to isolate access to a particular storage block of the plurality of storage devices to a single actively engaged application instance operating on a server within the server cluster and block access to the particular storage block each other application instance operative on any of the plurality of a servers.

2. The system for shared data access according to claim 1, wherein each server within the server cluster is configured to host one or more application instances.

3. The system for shared data access according to claim 1, wherein two or more of the plurality of servers in the server cluster operate on different operating systems.

4. The system for shared data access according to claim 1, wherein the cluster management system can operate on top of any operating system.

5. The system for shared data access according to claim 1, wherein the storage monitor engine includes a synchronization manager, a storage coordinator, a fencing engine, and a device administrator.

6. The system for shared data access according to claim 5, wherein the device enumerator identifies and maintains a list of storage devices associated with the data storage medium.

7. The system for shared data access according to claim 5, wherein the synchronization manager synchronizes configuration among servers within the server cluster as the plurality of servers within the server cluster change.

8. The system for shared data access according to claim 5, wherein the storage coordinator administers cluster-wide administrative commands related to access of storage device associated with the data storage medium.

9. The system for shared data access according to claim 1, wherein the single actively engaged application instance controls read-write access to the particular storage block of the plurality of storage devices until the single actively engaged application instance is no longer actively engaged.

10. The system for shared data access according to claim 5, wherein the device administrator manages reconfiguration requests directed to storage devices associated with the data storage medium.

11. The system for shared data access according to claim 5, wherein the fencing engine isolates access to only one application instance within the server cluster that is actively engaged with the storage device at the shared storage medium.

12. A computer-implemented method for data access to a shared data storage medium among a plurality of servers in a server cluster, the method comprising:
identifying one or more storage devices associated with the shared data storage medium;
enumerating the identified storage devices associated with the shared data storage medium;
forming, by a local monitor engine, one or more virtual hosts;
operating one or more application instances on top of the one or more virtual hosts;
coordinating between the plurality of servers in the sever cluster and each application instances by an actively engaged application instance exclusive access to a particular one of the one or more storage devices; and
isolating access to the particular one of the one or more storage devices to a single engaged application instance operating on a server within the server cluster responsive to the single engaged application instance being actively engaged with the particular one of the one or more storage devices.

13. The method for data access to a shared data storage medium among a plurality of servers in a server cluster according to claim 12, wherein each server includes a processor, an operating system, a local stand-alone file system, and a cluster management system.

14. The method for data access to a shared data storage medium among a plurality of servers in a server cluster according to claim 13, wherein the data storage medium is coupled to each of the servers within the server cluster and wherein a cluster management system communicates with each storage device to coordinate access among the plurality of servers to the data storage medium.

15. The method for data access to a shared data storage medium among a plurality of servers in a server cluster according to claim 12, wherein each server within the server cluster is configured to host one or more application instances.

16. The method for data access to a shared data storage medium among a plurality of servers in a server cluster according to claim 12, wherein two or more of the plurality of servers in the server cluster operate on different operating systems.

17. The method for data access to a shared data storage medium among a plurality of servers in a server cluster according to claim 12, wherein the cluster management system can operate on top of any operating system.

* * * * *